(12) United States Patent
Bergman et al.

(10) Patent No.: US 8,360,716 B2
(45) Date of Patent: Jan. 29, 2013

(54) NOZZLE SEGMENT WITH REDUCED WEIGHT FLANGE

(75) Inventors: Russell J. Bergman, Windsor, CT (US); Stephen J. Yea, Wethersfield, CT (US); Leonard A. Bach, West Hartford, CT (US); Joseph W. Bridges, Jr., Durham, CT (US); Lawrence J. Willey, East Hampton, CT (US); Brandon W. Spangler, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 429 days.

(21) Appl. No.: 12/730,180

(22) Filed: Mar. 23, 2010

(65) Prior Publication Data

US 2011/0236199 A1 Sep. 29, 2011

(51) Int. Cl.
*F01D 9/00* (2006.01)
(52) U.S. Cl. ................................ 415/190; 415/209.3
(58) Field of Classification Search .............. 416/189, 416/190, 192; 415/209.3, 209.2, 208.1, 173.1, 415/115
See application file for complete search history.

(56) References Cited

U.S. PATENT DOCUMENTS

| | | | |
|---|---|---|---|
| 3,529,903 A * | 9/1970 | Scalzo et al. ............... | 415/115 |
| 4,132,114 A | 1/1979 | Shah et al. | |
| 4,150,915 A | 4/1979 | Karstensen | |
| 4,512,712 A | 4/1985 | Baran, Jr. | |
| 4,585,390 A | 4/1986 | Pirtle et al. | |
| 4,720,236 A | 1/1988 | Stevens | |
| 5,078,576 A | 1/1992 | Hayton | |
| 5,129,783 A | 7/1992 | Hayton | |
| 5,149,250 A | 9/1992 | Plemmons et al. | |
| 5,222,360 A | 6/1993 | Antuna et al. | |
| 5,848,874 A | 12/1998 | Heumann et al. | |
| 6,077,035 A | 6/2000 | Walters et al. | |
| 6,155,056 A | 12/2000 | Sampath et al. | |
| 6,179,559 B1 | 1/2001 | Weaver | |
| 6,216,438 B1 | 4/2001 | Aschenbruck et al. | |
| 6,217,282 B1 | 4/2001 | Stanka | |
| 6,227,798 B1 | 5/2001 | Demers et al. | |
| 6,302,647 B1 | 10/2001 | Schueler et al. | |
| 6,386,825 B1 | 5/2002 | Burdgick | |
| 6,398,487 B1 | 6/2002 | Wallace et al. | |
| 6,418,618 B1 | 7/2002 | Burdgick | |
| 6,592,326 B2 | 7/2003 | Marx et al. | |
| 6,821,084 B2 | 11/2004 | Bathori et al. | |
| 6,830,427 B2 | 12/2004 | Lafarge et al. | |
| 6,899,518 B2 | 5/2005 | Lucas et al. | |
| 6,942,452 B2 | 9/2005 | Bruno et al. | |
| 7,101,150 B2 | 9/2006 | Bash et al. | |
| 7,134,286 B2 | 11/2006 | Markarian et al. | |
| 7,534,088 B1 * | 5/2009 | Alvanos et al. ............... | 415/115 |
| 7,611,324 B2 | 11/2009 | Lee et al. | |
| 2010/0266386 A1 * | 10/2010 | Broomer et al. ............. | 415/115 |

* cited by examiner

*Primary Examiner* — Richard Edgar
(74) *Attorney, Agent, or Firm* — Carlson, Gaskey & Olds PC

(57) ABSTRACT

A nozzle segment for a gas turbine engine includes a flange which extends from a vane platform, the flange includes a hollow cavity.

17 Claims, 8 Drawing Sheets

NOZZLE SEGMENT WITH REDUCED WEIGHT FLANGE

BACKGROUND

The present disclosure relates to a gas turbine engine turbine section, and more particularly to a reduced weight nozzle segment.

The core engine of a gas turbine engine typically includes a multistage axial compressor, a combustor and a high pressure turbine nozzle with one or more stages. Typical turbine nozzles, such as high pressure and low pressure turbine nozzles, define annular rings located adjacent to each turbine blade row.

SUMMARY

A nozzle segment for a gas turbine engine according to an exemplary aspect of the present disclosure includes a flange which extends from a vane platform, the flange includes a hollow cavity.

A nozzle segment for a gas turbine engine according to an exemplary aspect of the present disclosure includes a turbine vane which extends between an outer vane platform and an inner vane platform. A flange extends from the outer vane platform, the flange includes a hollow cavity.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
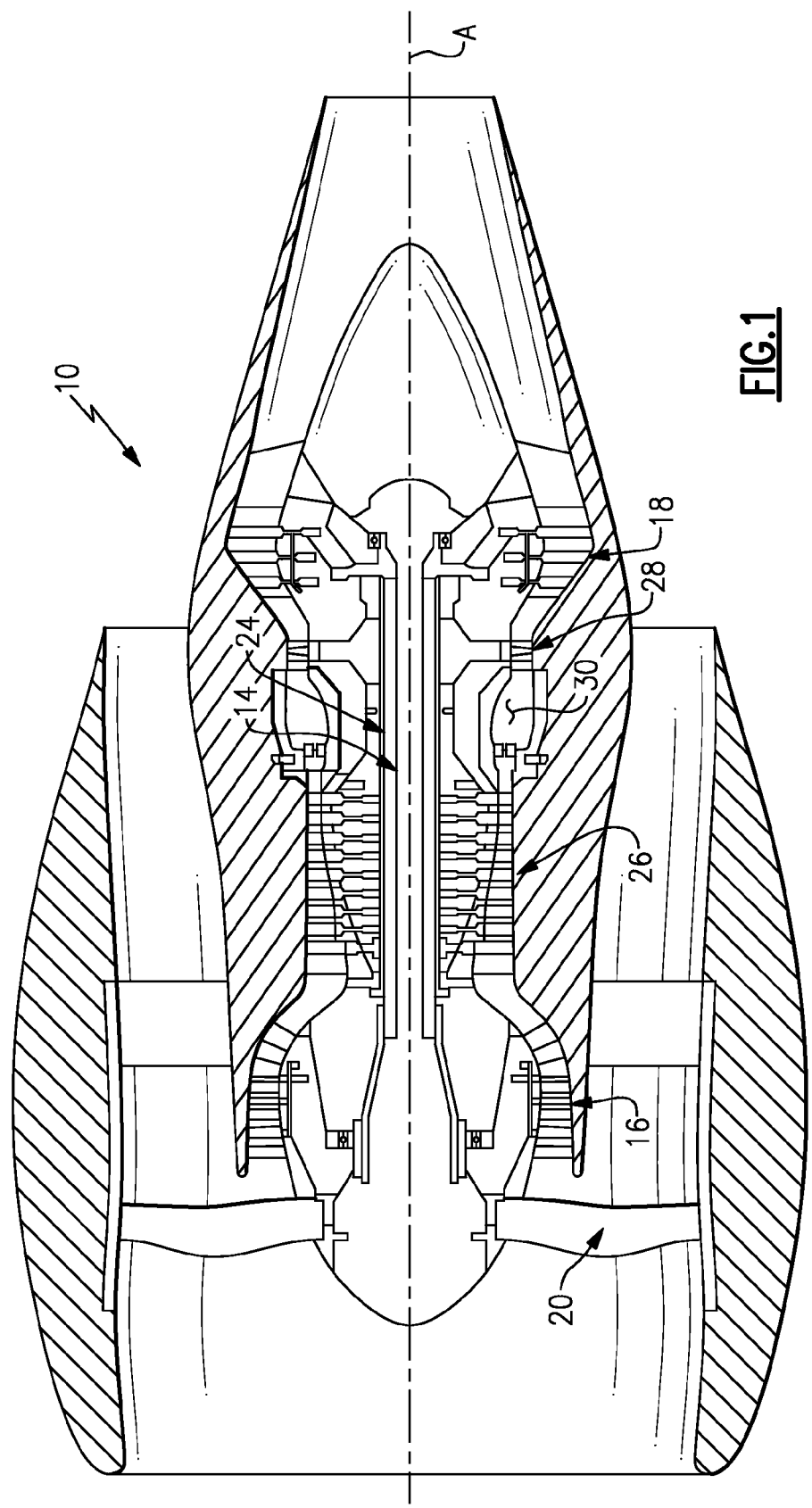
FIG. 1 is a general perspective view an exemplary gas turbine engine embodiment for use with the present disclosure.

FIG. 1 illustrates a general schematic view of a gas turbine engine 10 such as a gas turbine engine for propulsion. While a two spool high bypass turbofan engine is schematically illustrated in the disclosed non-limiting embodiment, it should be understood that the disclosure is applicable to other gas turbine engine configurations, including, for example, gas turbines for power generation, turbojet engines, low bypass turbofan engines, turboshaft engines, etc.

The engine 10 includes a core engine section that houses a low spool 14 and high spool 24. The low spool 14 includes a low pressure compressor 16 and a low pressure turbine 18. The core engine section drives a fan section 20 connected to the low spool 14 either directly or through a gear train. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

Air compressed in the compressors 16, 26 is mixed with fuel, burned in the combustor 30, and expanded in turbines 18, 28. The air compressed in the compressors 16, 26 and the fuel mixture expanded in the turbines 18, 28 may be referred to as a hot gas stream along a core gas path. The turbines 18, 28, in response to the expansion, drive the compressors 16, 26 and fan section 20.

Figure 2:
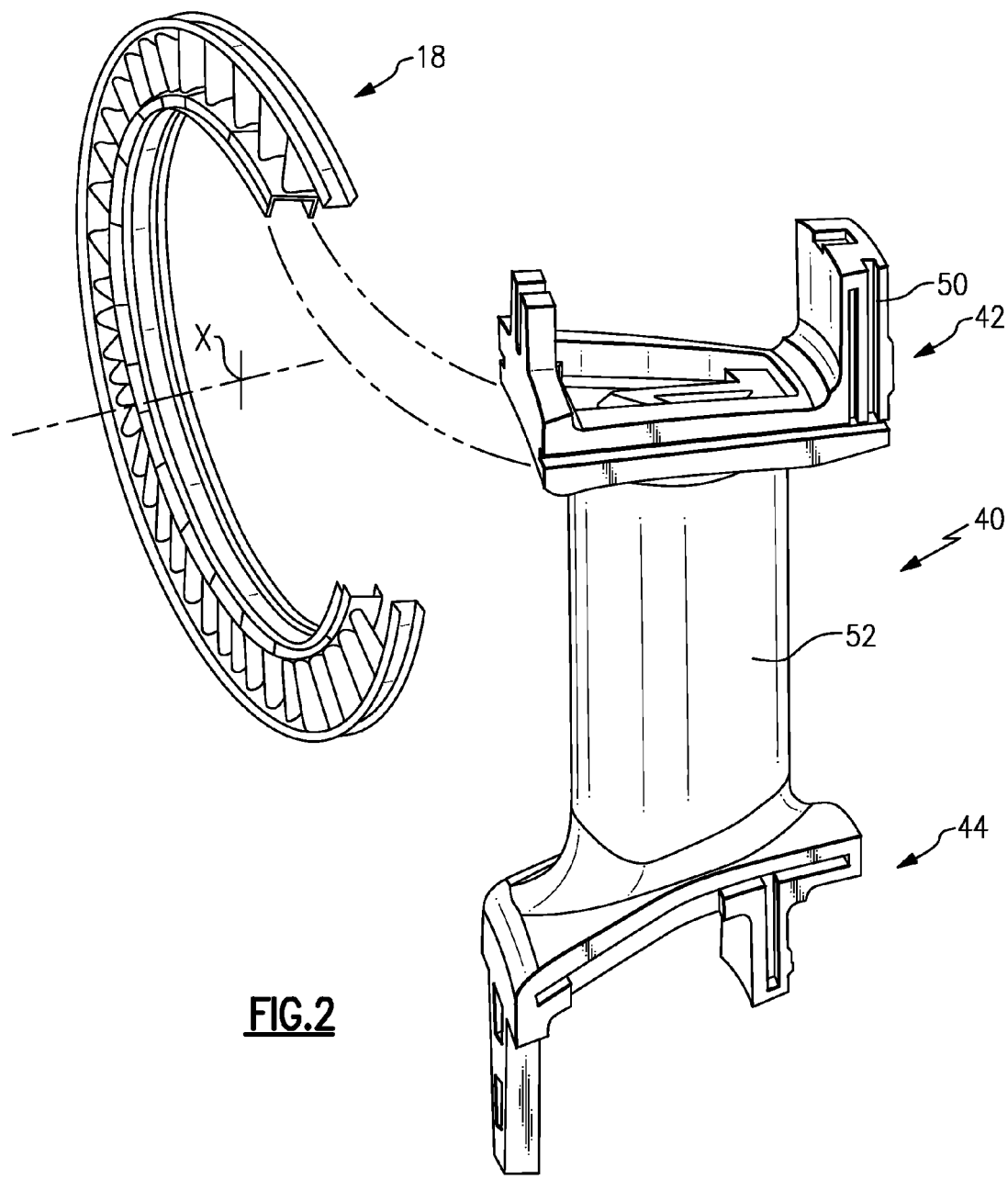
FIG. 2 is an expanded view of a vane portion of one turbine stage within a turbine section of the gas turbine engine, the vane portion formed from a multiple of turbine nozzle segments.

Referring to FIG. 2, a nozzle segment 40 includes an arcuate outer vane platform 42 and an arcuate inner vane platform 44 radially spaced apart from each other. The arcuate outer vane platform 42 may form a portion of an outer core engine structure 46 and the arcuate inner vane platform 44 may form a portion of an inner core engine structure 48 (FIG. 3) to at least partially define an annular turbine nozzle core gas flow path.

The circumferentially adjacent vane platforms 42, 44 thermally uncouple adjacent nozzle segments 40. That is, the temperature environment of the turbine section 18 and the substantial aerodynamic and thermal loads are accommodated by the plurality of circumferentially adjoining nozzle segments 40 which collectively form a full, annular ring about the centerline axis X of the engine. Although a nozzle segment 40 for a turbine nozzle are illustrated in the disclosed embodiment, it should be understood that other nozzle sections such as compressor nozzle sections may also benefit herefrom.

Each nozzle segment 40 may include one or more circumferentially spaced turbine vanes 52 which extend radially between the vane platforms 42, 44. That is, the full, annular ring formed by the multiple of nozzle segments 40 provide a vane portion of one stage in the turbine section 18 which is defined by the turbine vanes 52.

Figure 3:
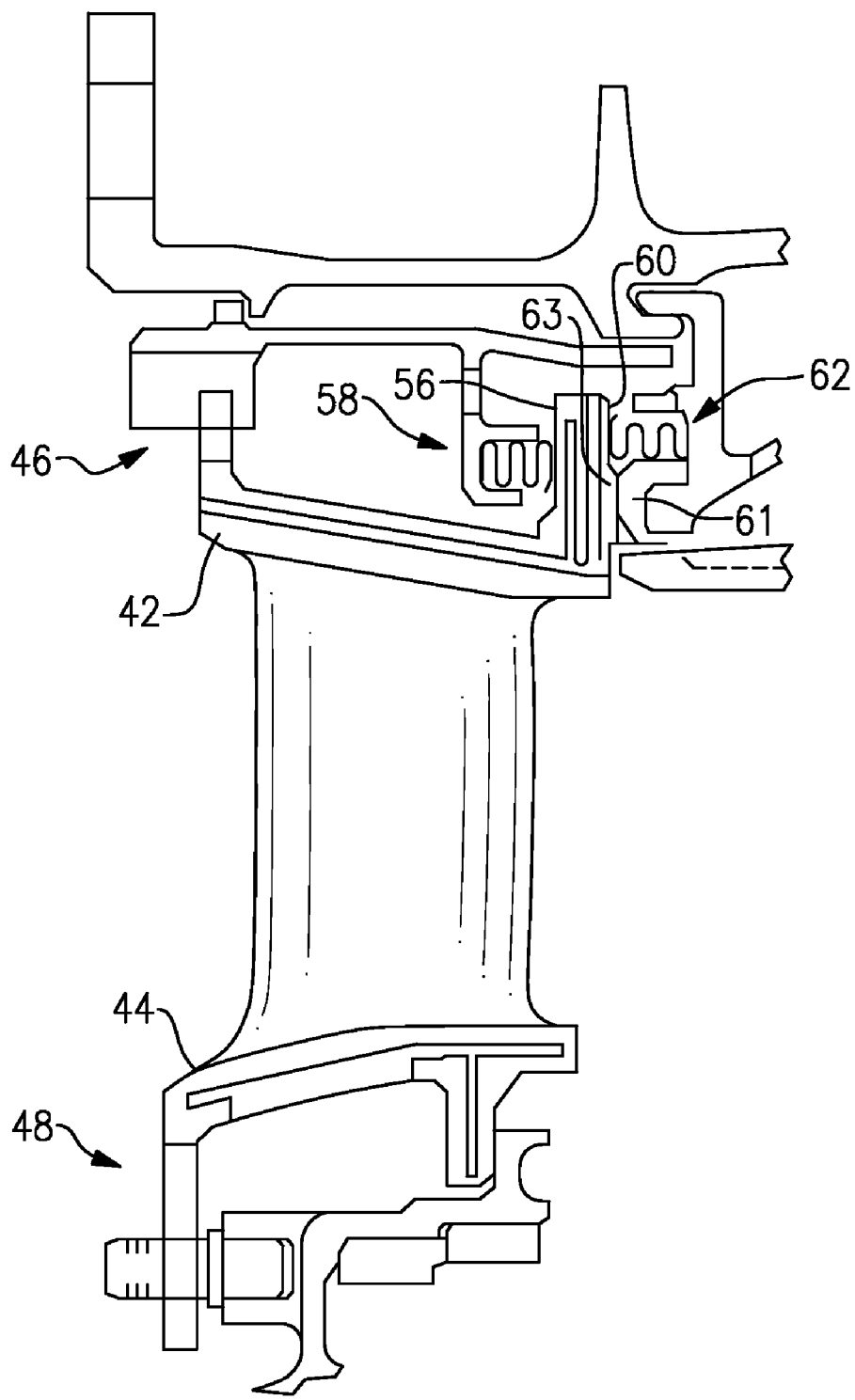
FIG. 3 is an expanded schematic sectional view of a turbine section.
Figure 4:
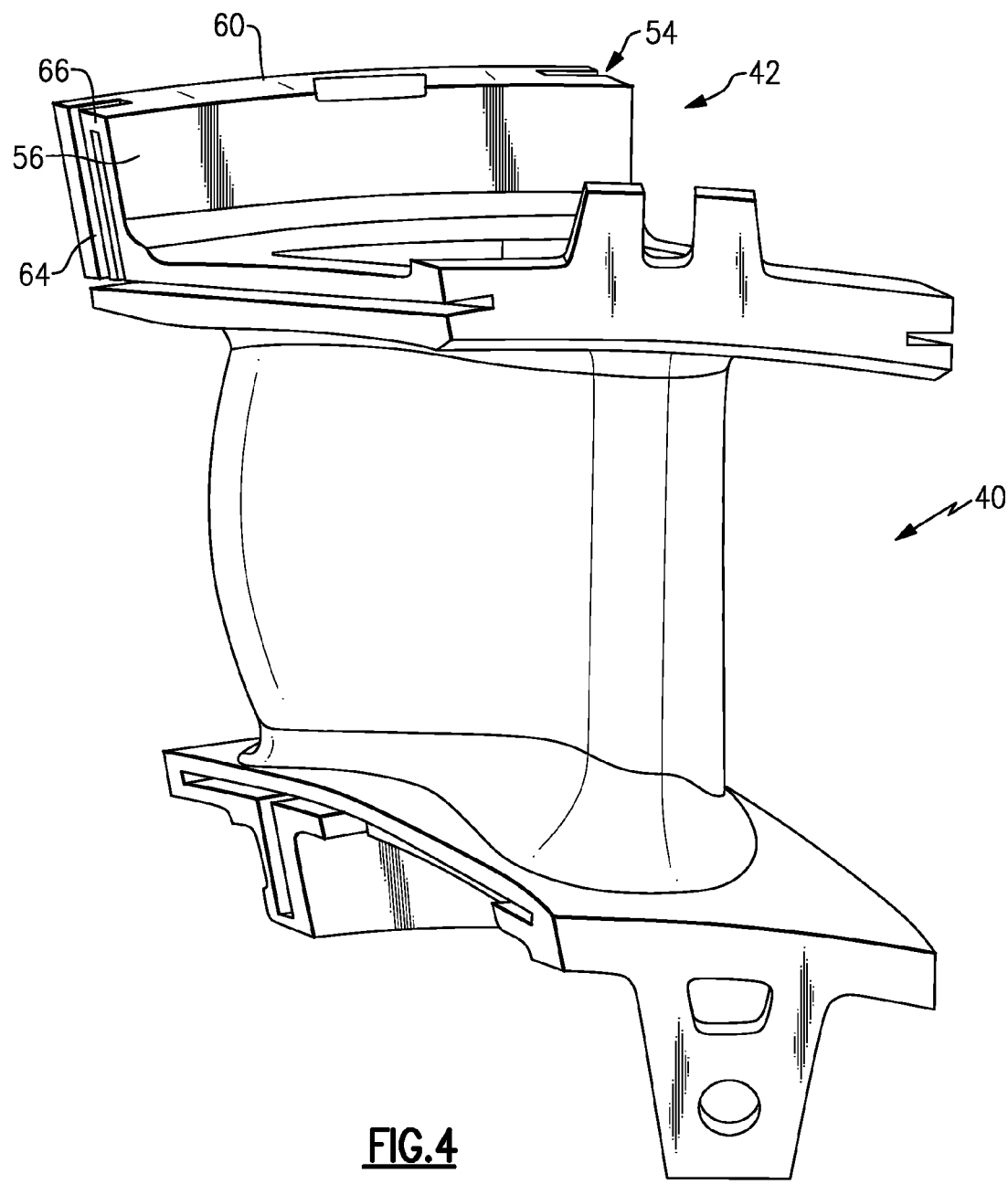
FIG. 4 is a perspective view of one variable turbine nozzle segment.

Referring to FIG. 4, the outer vane platform 42 includes a structural flange 54 which extends in a radial direction. The structural flange 54 operates as a forward seal surface 56 for a forward seal assembly 58 and an aft seal surface 60 for an aft seal assembly 62. (FIG. 3). The structural flange 54 also includes one or more featherseal slots 64 within a mate surface 66 to provide a seal between circumferential adjacent nozzle segments 40.

Figure 5:
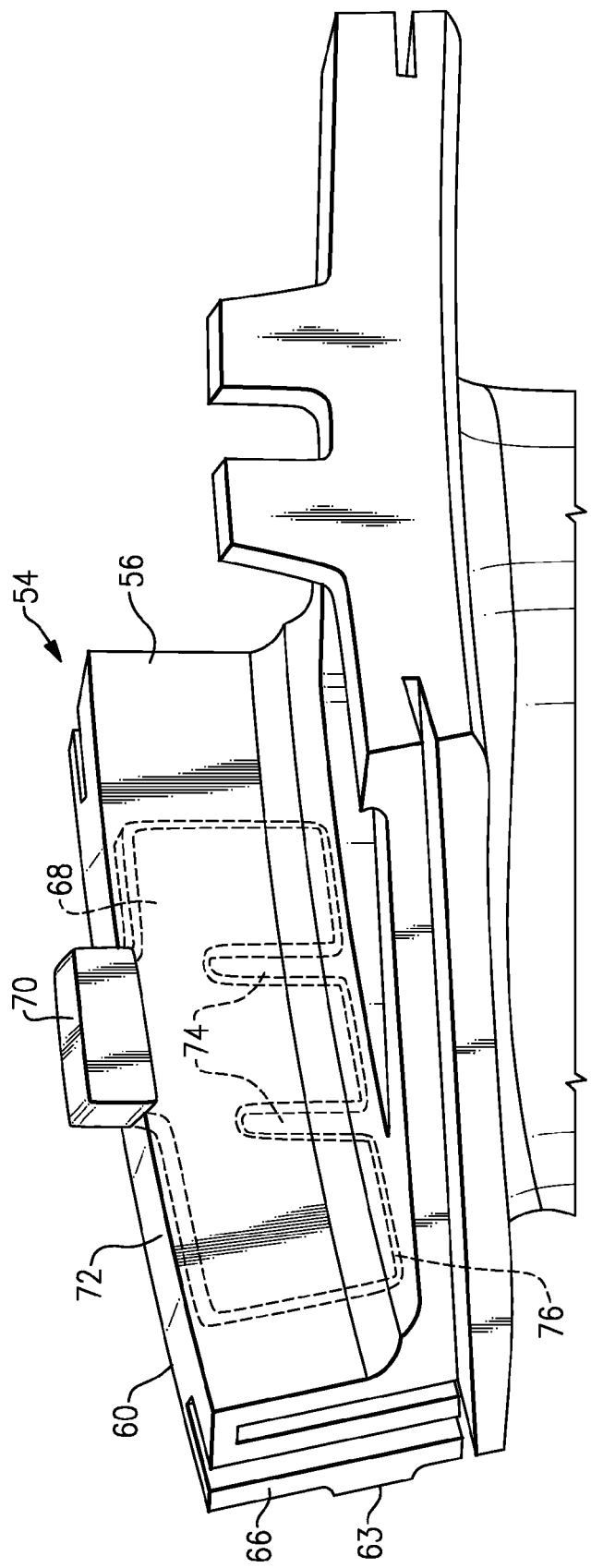
FIG. 5 is an expanded partial phantom view of a structural flange according to one non-limiting embodiment for the variable turbine nozzle segment.

Referring to FIG. 5, the structural flange 54 includes a hollow cavity 68 to reduce the weight thereof without functional effect. A relatively thick but partially hollow structural flange 54 is thereby provided which will readily support the axial load applied to the outer vane platform 42. Finite element analysis using ANSYS indicates this feature will not cause high stress areas. In one non-limiting embodiment, 3.5% decrease in weight is provided.

The hollow cavity 68 may be formed though a lost investment casting process which may utilize a ceramic core to hollow out the structural flange 54. A core print-out 70 may be located to extend through a radial face 72 of the structural flange 54 to facilitate manufacture.

The hollow cavity 68, in one non-limiting embodiment, may include a multiple of stiffening ribs 74. The multiple of stiffening ribs 74 extend through the hollow cavity 68 between the forward seal surface 56 and the aft seal surface 60. The multiple of stiffening ribs 74 may also extend through an inboard portion 76 of the hollow cavity 68. It should be understood that various stiffeners may alternatively or additionally be provided.

Figure 6:
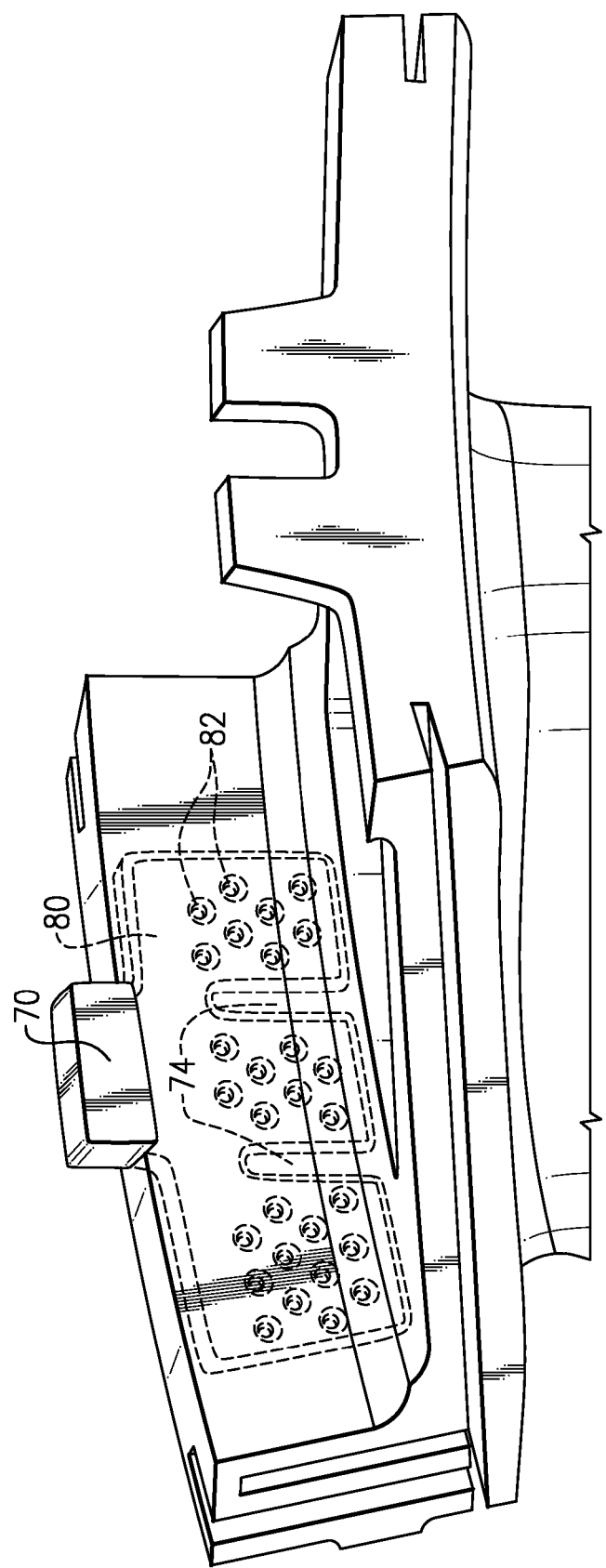
FIG. 6 is an expanded partial phantom view of a structural flange according to one non-limiting embodiment for the variable turbine nozzle segment.
Figure 7:
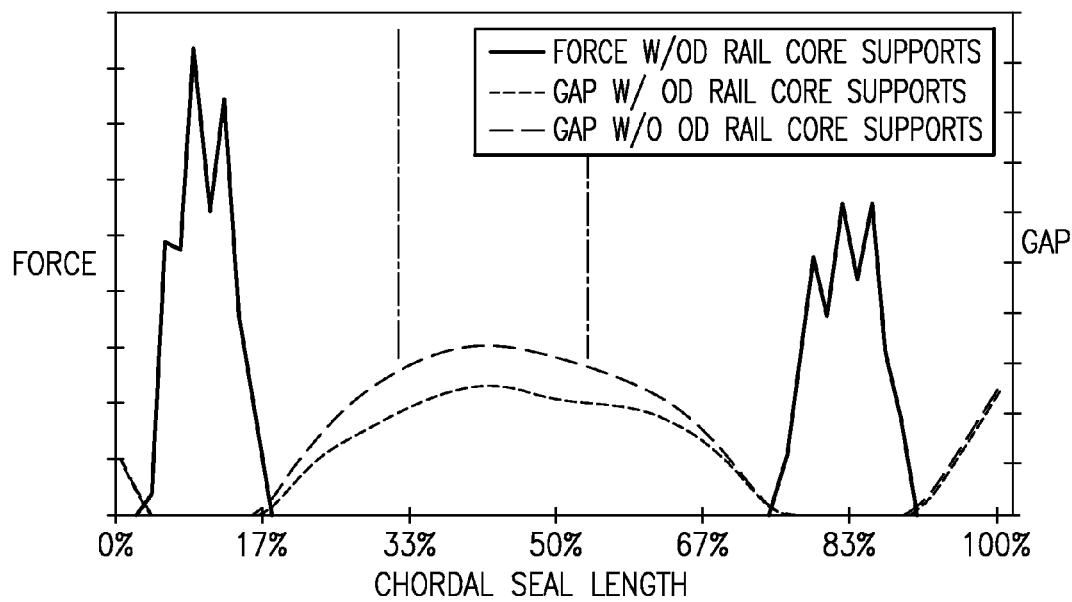
FIG. 7 is a graphical representation of the gap between the structural flange and the associated seal assemblies.

Referring to FIG. 6, a hollow cavity 80 in another non-limiting embodiment includes a multiple of stiffening features 82 such as pedestals, posts, ribs or other such features. The multiple of stiffening features 82 may be utilized with or without the multiple of stiffening ribs 74 (two shown) as well as other features. The stiffening features 82 may be formed with a ceramic core to optimize weight reduction with sufficient stiffness for a safe natural resonant frequency and bowing prevention of the seal assemblies 58, 62 as well as chordal seal 63 which is a machine-ground surface such that relative position is of significant criticality. That is, thermal differences may tend to cause curl in the structural flange 54 such that the seal assembly 58, 62 and/or chordal seal 63 may lift from their respective mate face surfaces 56, 60 and/or 61 which may increase cooling air leakage. In one non-limiting embodiment, the cumulative gap decreased by 22% with the stiffening ribs 74 (FIG. 7).

Figure 8:
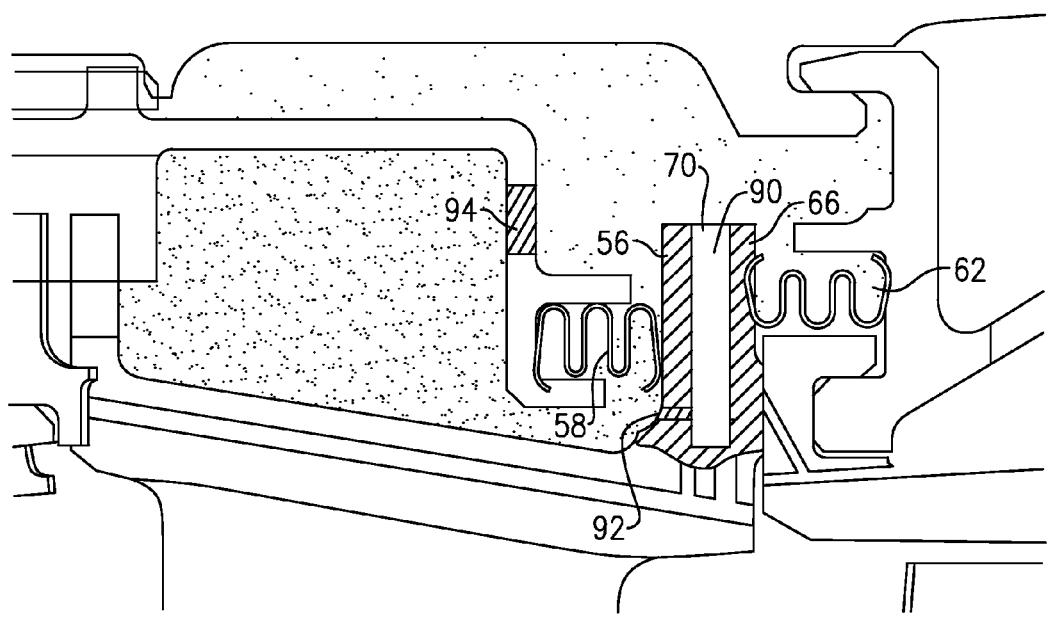
FIG. 8 shows a cross-sectional view of another non-limiting embodiment of a structural flange having a hollow cavity therein.

Referring to FIG. 8, a hollow cavity 90 in another non-limiting embodiment includes one or more purge openings 92 (FIGS. 9 and 10) in communication with a higher pressure region adjacent to the structural flange 54 which generally separates the higher pressure region from a lower pressure region in combination with the seal assemblies 58, 62. That is, the hollow cavity is located and in communication with the otherwise stagnant air between two cavities of different pressures that may already have a metered flow through a metered aperture 94. The flow from the metered aperture 94 is conventionally utilized so, the one or more purge openings 92 does not result in an overall cooling flow loss.

Figure 9:
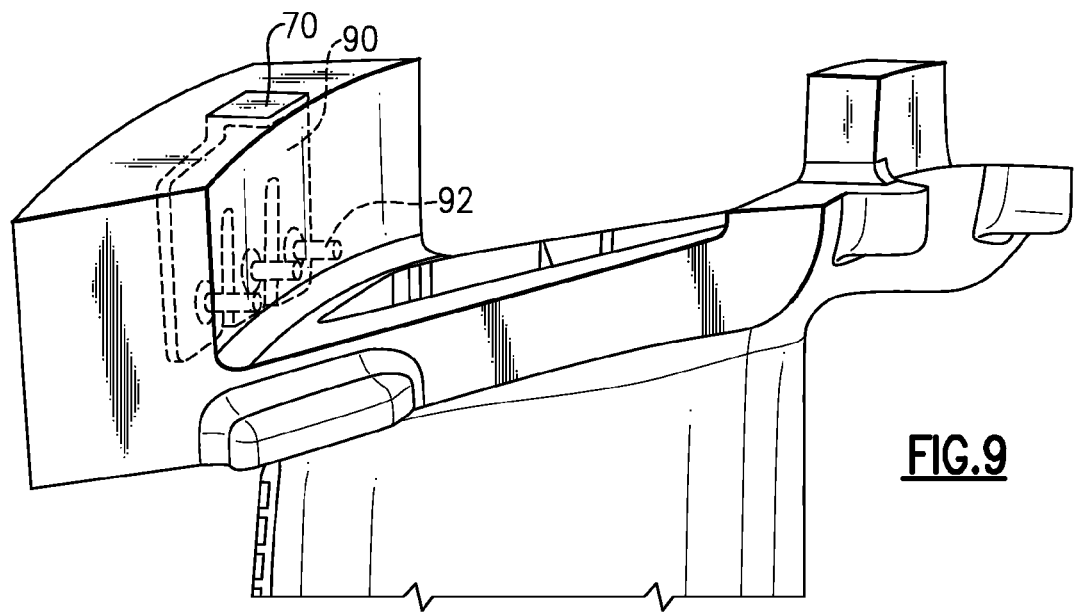
FIG. 9 shows a perspective view of a casting with a hollow cavity.
Figure 10:
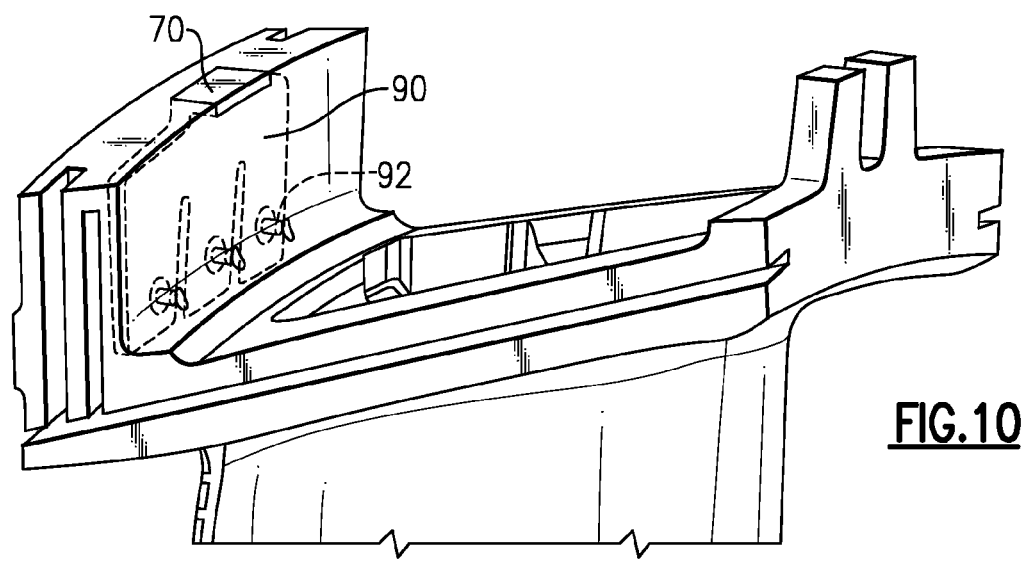
FIG. 10 shows a perspective view of the casting of FIG. 9 being machined.

The hollow cavity 90 receives air from the higher pressure cavity through the one or more purge openings 92 and expels the air through the core print-out 70 utilized during the casting process. (FIG. 8). The feed and/or exit holes may be created by machining with laser drilling, EDM, or grinding. The one or more purge openings 92 may alternatively be cast produced by the casting process from the wax die, core print-outs, or with "pedestals" in the ceramic. (FIGS. 9 and 10). The "pedestals" may not be visible in the casting (FIG. 9), but once the vane flange is machined, the pedestals are thereby opened to form the one or more purge openings 92 (FIG. 10).

The hollow cavity 90 with the one or more purge openings 92 minimize stagnant air that may otherwise result in oxidation and corrosion. A metered flow already exists between the two cavities, so the purge flow does not lose cooling flow. Multiple methods may be utilized to create the inlet and exit holes. The current application selected uses a pedestal in the ceramic core as the inlet and the core print-out as the exit; this configuration has the lowest recurring cost.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A nozzle segment for a gas turbine engine comprising:
   a vane platform;
   a flange which extends from said vane platform, said flange includes a hollow cavity and a stiffening feature within said hollow cavity.

2. The nozzle segment as recited in claim 1, wherein said stiffening feature is a rib.

3. The nozzle segment as recited in claim 1, wherein said stiffening feature is a post.

4. The nozzle segment as recited in claim 1, wherein said flange defines a first seal surface.

5. The nozzle segment as recited in claim 4, wherein said flange defines a second seal surface.

6. The nozzle segment as recited in claim 4, wherein said flange is an aft flange.

7. The nozzle segment as recited in claim 1, wherein said vane platform is an outer vane platform.

8. The nozzle segment as recited in claim 1, further comprising at least one purge opening in communication with said hollow cavity.

9. The nozzle segment as recited in claim 8, wherein said at least one purge opening extends through a first seal surface.

10. A nozzle segment for a gas turbine engine comprising:
    an outer vane platform;
    an inner vane platform;
    a vane which extends between said outer vane platform and said inner vane platform;
    a flange which extends from said outer vane platform, said flange includes a hollow cavity and
    a stiffening feature within said hollow cavity.

11. The nozzle segment as recited in claim 10, wherein said stiffening feature is a rib.

12. The nozzle segment as recited in claim 10, wherein said stiffening feature is a post.

13. The nozzle segment as recited in claim 10, wherein said flange defines a first seal surface and a second seal surface, said hollow cavity at least partially between said first seal surface and said second seal surface.

14. The nozzle segment as recited in claim 10, wherein said hollow cavity defines an opening through a radial face.

15. The nozzle segment as recited in claim 10, wherein said hollow cavity defines an opening through a forward seal surface.

16. A nozzle segment for a gas turbine engine comprising:
    an outer vane platform;
    an inner vane platform;
    a vane which extends between said outer vane platform and said inner vane platform; and
    a flange which extends from said outer vane platform, said flange includes a hollow cavity, wherein said hollow cavity defines an opening through a forward seal surface.

17. A nozzle segment for a gas turbine engine comprising: a vane platform; a flange which extends from said vane platform, said flange includes a hollow cavity and at least one purge opening in communication with said hollow cavity, wherein said at least one purge opening extends through a first seal surface.

* * * * *

UNITED STATES PATENT AND TRADEMARK OFFICE
CERTIFICATE OF CORRECTION

| | | |
|---|---|---|
| PATENT NO. | : 8,360,716 B2 | Page 1 of 1 |
| APPLICATION NO. | : 12/730180 | |
| DATED | : January 29, 2013 | |
| INVENTOR(S) | : Bergman et al. | |

It is certified that error appears in the above-identified patent and that said Letters Patent is hereby corrected as shown below:

ON THE TITLE PAGE:

Item (75) Inventor Yea's information should read as follows: --Stephen J. Yee, Wethersfield, CT (US)--

Signed and Sealed this
Fourth Day of June, 2013

Teresa Stanek Rea
*Acting Director of the United States Patent and Trademark Office*